Feb. 10, 1953     J. G. BERTHOLD, JR     2,628,169
CONFECTIONERY CONTAINER
Filed April 18, 1951     2 SHEETS—SHEET 1
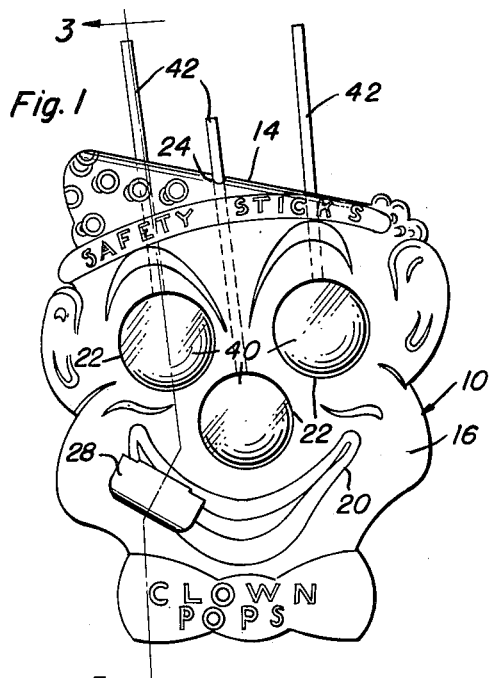
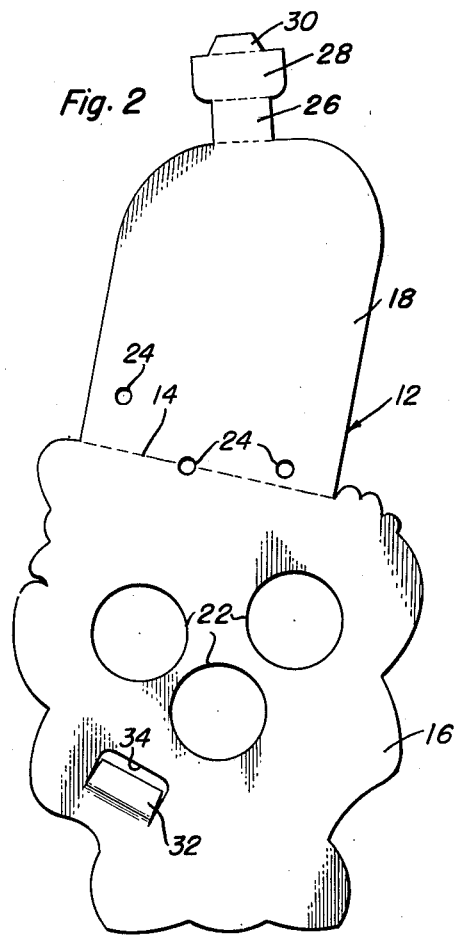
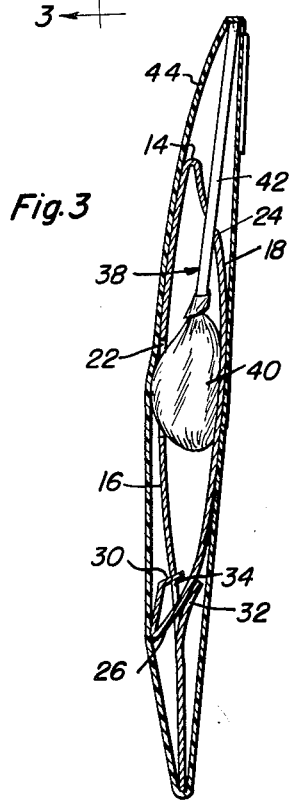
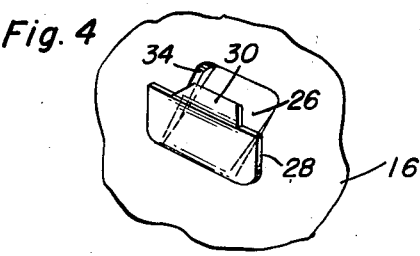
John G. Berthold, Jr.
*INVENTOR.*

Feb. 10, 1953　　　J. G. BERTHOLD, JR　　　2,628,169
CONFECTIONERY CONTAINER
Filed April 18, 1951　　　2 SHEETS—SHEET 2
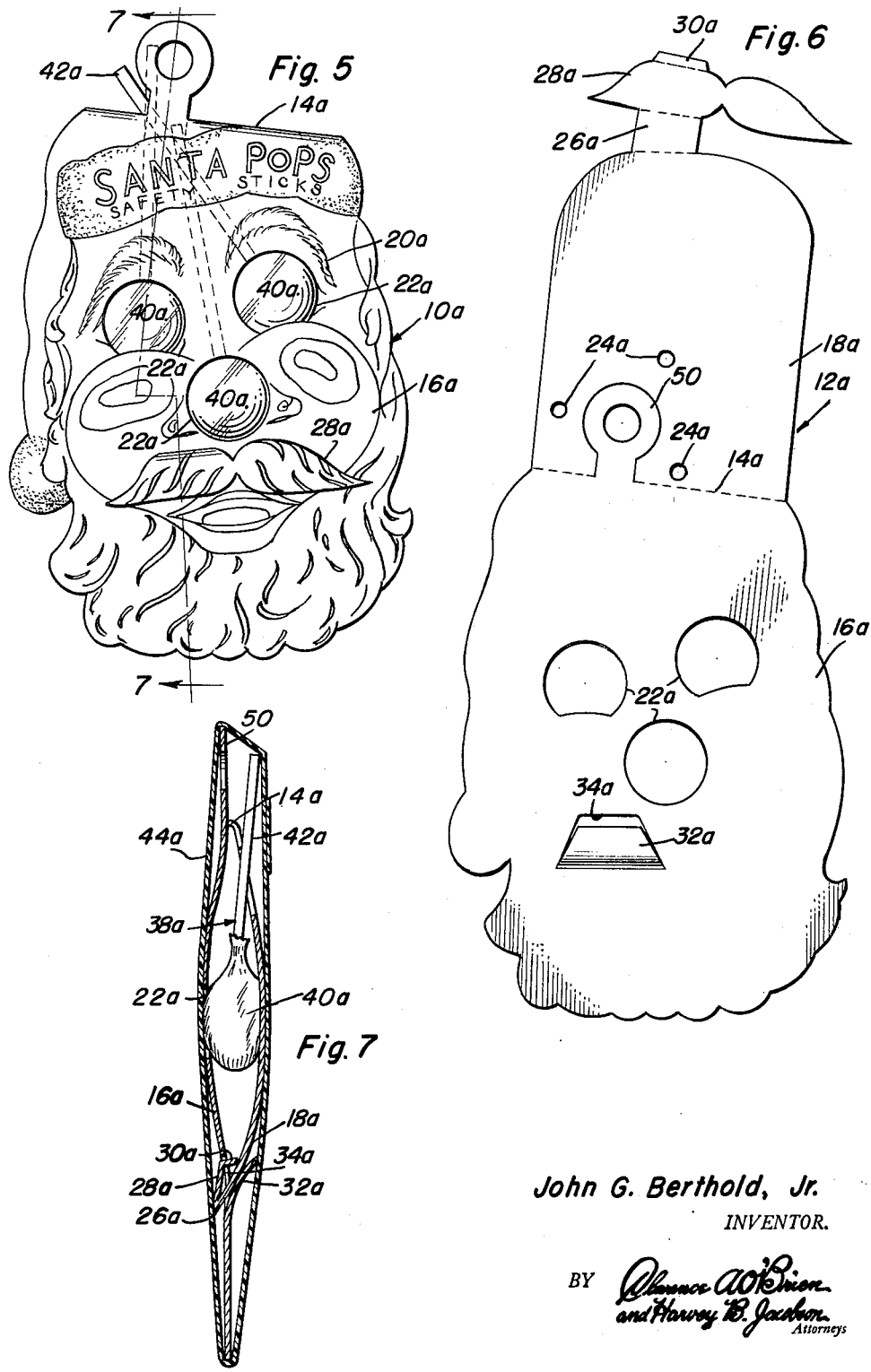
John G. Berthold, Jr.
INVENTOR.

Patented Feb. 10, 1953

2,628,169

UNITED STATES PATENT OFFICE 2,628,169

CONFECTIONERY CONTAINER

John G. Berthold, Jr., Huntington, W. Va., assignor to The J. G. Berthold Co., a corporation of West Virginia Application April 18, 1951, Serial No. 221,593

1 Claim. (Cl. 99—180)

This invention relates to new and useful improvements and structural refinements in containers for confectionery, more particularly confectionery of the so-called "sucker" variety consisting of a substantially spherical edible member mounted at one end of a wooden stick which forms a handle, and the principal object of this invention is to provide a highly ornamental container wherein the confectionery itself complements the ornamentation.

The above object is achieved by the provision of a container having a front wall provided with surface ornamentation and with openings in which the confectionery is disposed so as to complement the ornamentation and, at the same time, to facilitate sustaining of the confectionery in the container.

Some of the advantages of the invention reside in its extreme simplicity of construction, in its highly pleasing and unique appearance, and in its adaptability to economical manufacture.

With the above more important objects and features in view and such other objects and features as may become apparent as this specification proceeds, the invention consists essentially in the arrangement and construction of parts as illustrated in the accompanying drawings, in which:

Figure 1 is a front elevational view of the container with the confectionery therein;

Figure 2 is a developed plan view of the blank of material from which the container is formed;

Figure 3 is a vertical sectional view, taken substantially in the plane of the line 3—3 in Figure 1 and illustrating the container as being enclosed by a transparent wrapper;

Figure 4 is a fragmentary perspective detail of a portion of the container;

Figure 5 is a front elevational view, similar to that shown in Figure 1, but illustrating a modified embodiment of the invention;

Figure 6 is a developed plan view of a blank of material from which the container shown in Figure 5 is made; and Figure 7 is a vertical sectional view, taken substantially in the plane of the line 7—7 in Figure 5, but with the container disposed in a transparent wrapper.

Like characters of reference are employed to designate like parts in the specification and throughout the several views.

Referring now to the accompanying drawings in detail, more particularly to Figures 1-4, inclusive, the confectionery container, designated generally by the reference character 10, is formed from a blank of foldable material 12, such as cardboard, or the like, the blank 12 being doubled upon itself along a transverse fold line 14 so as to provide a front wall 16 and a back wall 18, as will be clearly apparent.

When the blank is folded, the walls 16, 18 are connected together at the upper edge of the container immediately adjacent the fold 14, and it is to be noted that the front wall 16 is configurated and provided with suitable surface ornamentation 20, so as to present the appearance of a clown, or the like. Moreover, the front wall 16 is provided with a plurality of substantially circular openings 22, while a plurality of apertures 24 are provided in the folded portion 14 of the blank, as is clearly shown in Figure 2.

The back wall 18, on the other hand, is provided integrally with a relatively narrow tongue 26 equipped with a relatively wide portion 28 and with a protuberance 30 which is substantially equal in width to the tongue 26, while the front wall 16 has a portion 32 struck rearwardly therefrom so as to afford a passage 34.

Confectionery in the form of a plurality of so-called "suckers" designated generally by the reference character 38 is positioned in the container, each of these "suckers" comprising a wrapped, edible member 40 mounted at one end of a stick or handle 42. The members 40 are disposed between the front and back walls 16, 18, respectively, so that they are seated in the openings 22 as is best shown in Figure 3, while the handles 42 thereof project upwardly through the apertures 24.

By folding the portion 28 of the tongue 26 towards the center, the portion 28 may then be passed forwardly through the passage 34 so that the tongue 26 is disposed in the passage while the portion 28 thereof is disposed forwardly of the front wall 16 and the protuberance 30 reenters the passage 34, as is best known in Figure 3. In this manner, the lower end portions of the walls 16, 18 are connected together, it being understood that after the tongue is inserted through the passage, the portion 28 of the tongue is permitted to resume its normal, flat position, so that accidental or unintentional retraction of the tongue from the passage is prevented. In other words, the portion 28 is substantially wider than the passage 34 and, accordingly, it cannot pass through the passage unless it is folded inwardly.

The openings 22 are provided at appropriate points on the front wall 16 so that the portions of the members 40 which are disposed in the openings complement the surface ornamentation on the front wall, such as, for example, by stimulating the eyes and the nose of the clown, as shown in Figure 1. Moreover, the passage 34 itself is formed substantially in the region of the "mouth" of the clown, so that the elements 26, 28, in fact, represent the "tongue" of the clown.

If desired, the entire container and confectionery therein may be supplied to the purchaser inside a transparent wrapper or envelope, such as is shown at 44 in Figure 3.

Referring now to the accompanying Figures 5-7, inclusive, which illustrate a modified embodiment of the invention, this embodiment is substantially the same in construction as the embodiment already described and the same reference numerals are employed for designating the respective elements, with the exception that the suffix "a" has been added to the reference numerals in the modified embodiment.

However, while the portion 28 of the tongue 26 is only slightly wider than the tongue itself, the portion 28a of the tongue 26a is substantially wide, so as to represent "whiskers," as shown in Figure 5. Moreover, an apertured, upwardly projecting tab 50 is struck out from the back wall 18a so as to constitute an upward continuation of the front wall 16a, to facilitate hanging of the entire container on the wall, or the like, after it is removed from the transparent wrapper 44a.

It is believed that the advantages and use of the invention will be clearly understood from the foregoing disclosure and, accordingly, further description thereof at this point is deemed unnecessary.

Having described the invention, what is claimed as new is:

As a product of manufacture, the combination of a transparent envelope having closed upper and lower ends, a container positioned in said envelope and comprising a single sheet of material doubled upon itself along a transverse fold line to provide front and back walls permanently connected together at the fold line disposed at the top of the container, said walls defining an open sided pocket therebetween, the front wall extending downwardly below the lower end of the back wall and being in supportable engagement with the closed lower end of said envelope, means separably connecting the lower end of the back wall to the front wall at a point spaced upwardly from the lower end of the front wall, the upper end of said container being spaced downwardly from the upper end of said envelope, the front wall of the container being provided substantially at the center thereof with an opening affording a seat, an article of confectionery positioned in said pocket against the back wall and engaging said seat, the back wall being provided with an aperture at a point adjacent said fold line, and a stick-shaped handle provided on said article of confectionery and extending upwardly and outwardly from said container through said aperture, the upper end of said handle being in supportable engagement with the closed upper end of said envelope.

JOHN G. BERTHOLD, Jr.

REFERENCES CITED

The following references are of record in the file of this patent:

UNITED STATES PATENTS

| Number | Name | Date |
|---|---|---|
| 1,174,593 | McClurg | Mar. 7, 1916 |
| 1,794,311 | Mendell | Feb. 24, 1931 |
| 1,877,229 | Del Papa | Sept. 13, 1932 |
| 1,879,952 | Rosen | Sept. 27, 1932 |
| 1,949,161 | Haug | Feb. 27, 1934 |
| 2,085,414 | Cavanagh | June 29, 1937 |

FOREIGN PATENTS

| Number | Country | Date |
|---|---|---|
| 398,044 | Great Britain | Sept. 7, 1933 |
| 756,235 | France | Sept. 18, 1933 |